May 6, 1952      F. LOHUTKO      2,595,591

APPARATUS FOR GRINDING HELICAL GEARS

Filed Dec. 14, 1948      2 SHEETS—SHEET 1

INVENTOR
FLORYAN LOHUTKO
BY
Toulmin & Toulmin
ATTORNEYS

May 6, 1952   F. LOHUTKO   2,595,591
APPARATUS FOR GRINDING HELICAL GEARS
Filed Dec. 14, 1948   2 SHEETS—SHEET 2
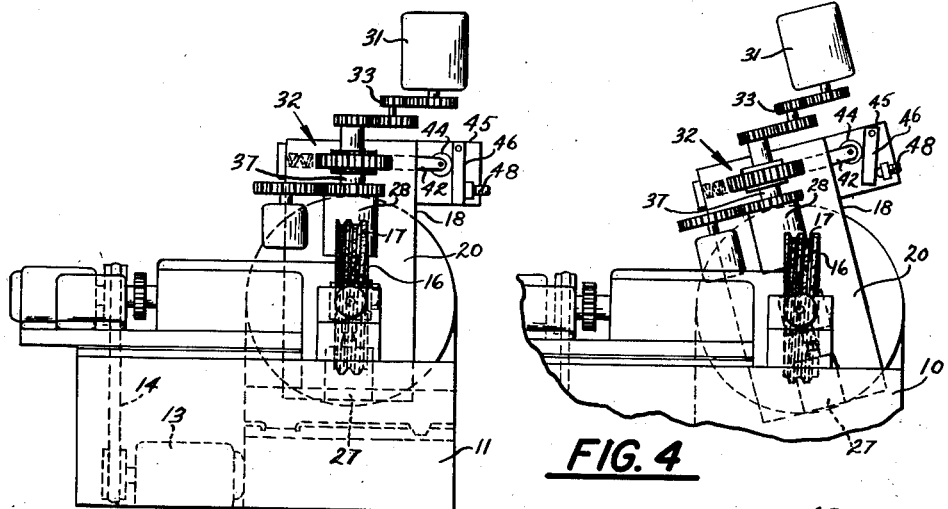
FIG. 3
FIG. 4
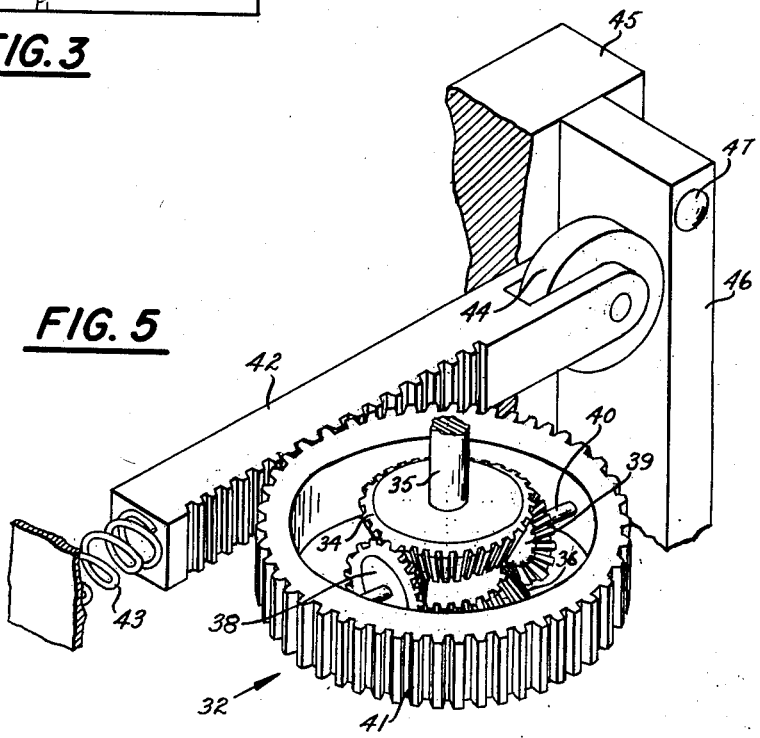
FIG. 5
INVENTOR
FLORYAN LOHUTKO
BY~
Toulmin & Toulmin
ATTORNEYS Patented May 6, 1952

2,595,591

UNITED STATES PATENT OFFICE 2,595,591

APPARATUS FOR GRINDING HELICAL GEARS

Floryan Lohutko, Detroit, Mich., assignor to The Thompson Grinder Company, Springfield, Ohio, a corporation of Ohio Application December 14, 1948, Serial No. 65,258

7 Claims. (Cl. 51—95)

The present invention deals with the grinding of gears and is concerned primarily with certain methods and apparatus designed for the grinding of helical gears.

In the co-pending application of Floryan Lohutko, Serial No. 65,255 filed December 14, 1948, and issued as Patent No. 2,560,967 on July 17, 1951, for Method and Apparatus for Grinding Gears and Gear Cutters, there is illustrated and described certain methods and apparatus for the grinding of straight gears.

This apparatus is characterized as including a grinding wheel having a helical groove formed on its cylindrical surface and which performs the grinding action.

In the grinding of straight gears there are three essential movements which must be properly synchronized. One of these is the rotary motion that is imparted to the grinding wheel, the second is the rotary motion which is imparted to the work, and the third is the feed which moves the work rectilineally past the grinding wheel.

The grinding of helical gears presents an additional problem as compared to the grinding of straight gears, in that the "lead" of the helical gears must be accommodated. This, in effect, requires that a fourth movement be added to the operation.

With the foregoing conditions in mind, the present invention has in view as its foremost objective the provision of a method for grinding helical gears and which includes the synchronized steps of rotating the grinding wheel, rotating the work, feeding the work to the grinding wheel, and finally imparting an additional increment of rotation to the work to accommodate the lead of the helical gear being ground.

Yet another highly important object of the invention is the provision of apparatus for carrying out the above outlined method.

In the grinding of gears it has been the practice to include change gear mechanism for driving the work, a particular gear ratio being selected to insure that the work be rotated at the proper speed.

When a helical gear is to be ground it is, of course, necessary to rotate the work at a speed which will accommodate the lead of the helical gear. In the past this additional increment of movement has been provided for in the change gear mechanism. However, it has involved very intricate and complex calculations and a corresponding complexity in the gear trains necessary to achieve the speeds that have been computed.

Another highly important object of the present invention is the provision of a novel method and apparatus for adapting the grinding machine to the lead of any particular helical gear.

In carrying out this idea a differential is included in the drive from the power source to the work. This differential includes a pair of bevel gears which are pivotally mounted on a shaft that is journaled in an externally toothed ring gear. Meshing with the latter is a rack which is spring biased in one direction and which carries a roller that is urged by the spring into engagement with a sine bar.

The sine bar is relatively stationary and is inclined at an appropriate angle depending upon the lead of any particular helical gear being ground. As the work is fed the sine bar exerts a camming influence on the roller to move the rack and thereby to rotate the ring gear. This in turn rotates the pair of bevel gears and imparts an additional increment of movement to the work, so as to accommodate the lead of the helical gear being ground.

A further somewhat more detailed object of the invention is the provision, in helical gear grinding apparatus of the type indicated, of means for adjusting the angle of the sine bar to adapt the machine to the lead of any particular helical gear being ground.

Various other more detailed objects and advantages of the invention, such as arise in connection with carrying out the above noted ideas in a practical embodiment, will in part become apparent and in part be hereinafter stated as the description of the invention proceeds.

The invention therefore comprises novel method and apparatus for the grinding of helical gears and which includes steps and means for accommodating the lead of a helical gear being ground in a highly simplified manner.

For a full and more complete understanding of the invention reference may be had to the following description and accompanying drawings wherein:

Figure 3 is a view in end elevation;

Figure 4 is a fragmentary end elevation similar to Figure 3 showing the machine in a different position of adjustment for feeding the work at an angle; and Figure 5 is an enlarged detailed view in perspective of the differential and rack and gear mechanism immediately associated therewith.

Figure 1:
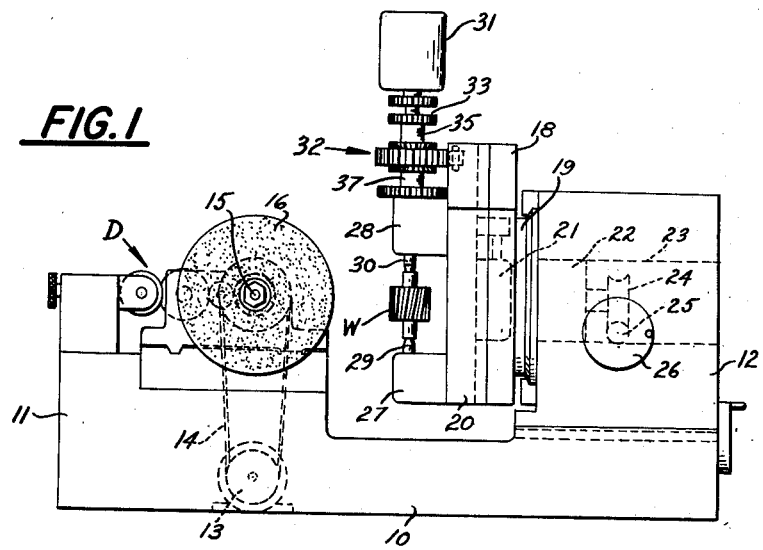
Figure 1 is a view in side elevation of a grinding machine designed in accordance with the precepts of this invention.
Figure 2:
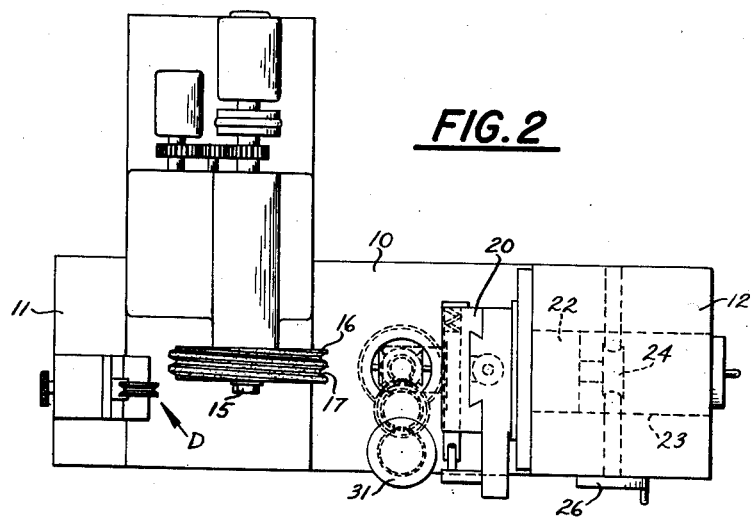
Figure 2 is a top plan view of the machine illustrated in Figure 1.

Referring now to the drawings wherein like reference characters denote corresponding parts, and first more particularly to Figures 1, 2 and 3, the improved grinding machine is shown as comprising a bed 10, from which upstands at one end supporting structure for the grinding wheel, and which supporting structure is designated 11, while upstanding from the other end is supporting structure 12 for the work driving mechanism.

As brought out in Figures 1 and 3, a motor 13 is included in the bed 10 and illustrated by the broken lines. This motor is connected by a drive belt 14 with a shaft 15 on which is drivably mounted a grinding wheel 16. This grinding wheel is formed with a helical groove 17 in accordance with the practice set forth in the copending application of Floryan Lohutko above identified.

It is notable that Figures 1 and 2 illustrate the mechanism which may be employed for dressing the grinding wheel 16, although this is not a particular part of the invention. This mechanism is referred to generally by the reference character D and when occasion demands the grinding wheel 16 is subjected to the action of this mechanism.

Carried by the support 12 is a turn table 18 which is rotatably supported on a horizontal axis as represented at 19. Carried by this turn table 18 is a slide 20 which is moved under the influence of a hydraulic cylinder and piston assembly represented by the broken lines at 21. It is this movement of the slide 20 which will feed the work to be later described to the grinding wheel.

In order to provide for adjustment of the turn table 18 it will be noted that a trunnion 22 extends inwardly from the structure 19 and is received in a cylindrical passage 23 within the support 12.

A worm gear 24 is drivably carried at the free end of this trunnion and meshing therewith is a complemental worm that is drivably carried on a shaft 25 at the free end of which is an operating member in the form of a hand wheel 26. Thus, the hand wheel 26 may be rotated to adjust the angular position of the turn table 18.

Extending outwardly from the slide 20 is a tailstock support 27 and a headstock support 28. The tailstock is shown at 29 and the headstock at 30. The work is represented at W as being mounted between the headstock and tailstock in a well known manner.

Inasmuch as the present invention is designed for the grinding of helical gears the work W will be a helical gear, the teeth of which have a definite lead.

The work is driven from the headstock 30. This is accomplished by a motor 31, which is preferably a selsyn receiver that is controlled by the motor 13 so as to be operated in synchrony therewith.

A differential shown at 32 is included in the drive from the motor 31 to the headstock 30. Between this differential 32 and the motor 31 there is the usual gear train 33 which provides for the proper gear ratio in the drive.

Upon referring to Figure 5 it will be noted that the differential includes a bevel gear 34 which is mounted on one end of a shaft 35 that is drivably connected to the gear train 33.

A second bevel gear 36 is disposed opposite to the bevel gear 34 and mounted on the free end of a shaft 37 that is drivably connected to the headstock 30.

Meshing with the bevel gears 34 and 36 are the bevel gears 38 and 39 which are pivotally mounted on a shaft 40. The ends of the latter are embedded in a large ring gear 41 which encompasses the differential 32.

Meshing with the ring gear 41 is a rack 42 that is urged to the right (speaking with reference to the showing of the drawing) by a spring shown at 43. At the end remote from the spring 43 the rack 42 carries a roller 44.

The mechanism so far described is movable with the slide 20.

A stationary support is represented at 45 and a sine bar 46 is pivotally mounted thereon as represented at 47. This sine bar is engaged by the roller 44 and functions as a cam to impart a rectilineal movement to the rack 42 as an incident to the feeding of the work.

Due to the pivotal mounting at 47 the sine bar 46 may be adjusted to any appropriate angle and the adjustment maintained by the holding device represented at 48.

With the ring gear 41 held stationary the rotative motion of the shaft 35 would be transmitted to the shaft 37 through the bevel gears 34, 36, 38, and 39 without there being any difference in the speeds of rotation of the two shafts.

However, when the ring gear is rotated under the influence of the rack 42, which movement is in turn caused by engagement of the roller 44 with the sine bar 46, as an incident to the feeding of the work, the shaft 37 is imparted an added increment of rotation which causes it to rotate faster than the shaft 35. Thus, the lead of the work W is accommodated.

Figure 3 illustrates a straight line feed on the part of the slide 20 and in this view the sine bar is substantially normal to the rack 42 so as to cause no effect thereon. Under these conditions of operation straight gears are ground, as there is no provision made for accommodating the lead of the work.

Figure 4 shows the arrangement in which the turn table 18 has been adjusted so as to cause the slide 20 to be moved at an angle, and the sine bar 46 is so arranged with respect to the rack 42 as to exert a camming influence thereon as the work is fed and gives this added increment which is necessary to accommodate the lead of the helical gear.

While a preferred specific embodiment of the invention is hereinbefore set forth, it is to be clearly understood that the invention is not to be limited to the exact constructions, devices and mechanisms illustrated and described, because various modifications of these details may be provided in putting the invention into practice within the purview of the appended claims.

What is claimed is:

1. In apparatus for grinding helical gears, a workpiece support adapted to receive a workpiece having helical gears, a power source for rotating said workpiece, means for moving said workpiece in a rectilineal path to feed it to a grinding wheel, driving connections between said power source and said workpiece support, a differential included in said driving connections and including a pair of bevel gears mounted on a shaft carried by a ring gear, a rack engaging said ring gear, and cam means for moving said rack as an incident to feeding movement of said workpiece to rotate said ring gear and impart an added increment of rotation to said workpiece.

2. In apparatus for grinding helical gears, a shaft having a bevel gear on one end and drivably connected to a power source at the other, a second shaft having a bevel gear on one end opposed to said first shaft and operatively connected at its other end to workpiece supporting means for rotating a workpiece held thereby; a pair of opposed bevel gears complemental to and meshing with the first two said bevel gears, a shaft on which said last mentioned pair of gears are journaled, a ring gear carrying said shaft, a rack meshing with said ring gear, and cam means for moving said rack as an incident to rectilineal movement thereof.

3. In apparatus for grinding helical gears, a shaft having a bevel gear on one end and drivably connected to a power source at the other, a second shaft having a bevel gear on one end opposed to said first shaft and operatively connected at its other end to workpiece supporting means for rotating a workpiece held thereby; a pair of opposed bevel gears complemental to and meshing with the first two said bevel gears, a shaft on which said last mentioned pair of gears are journaled, a ring gear carrying said shaft, a rack meshing with said ring gear, spring means for urging said rack in one direction, and cam means for moving said rack in the opposite direction against the influence of said spring means.

4. In apparatus for grinding helical gears, a shaft having a bevel gear on one end and drivably connected to a power source at the other, a second shaft having a bevel gear on one end opposed to said first shaft and operatively connected at its other end to workpiece supporting means for rotating a workpiece held thereby; a pair of opposed bevel gears complemental to and meshing with the first two said bevel gears, a shaft on which said last mentioned pair of gears are journaled, a ring gear carrying said shaft, a rack meshing with said ring gear, spring means at one end of said rack for urging it in one direction, a roller at the other end of said rack, and a cam bar engaging said roller.

5. In apparatus for grinding helical gears, a shaft having a bevel gear on one end and drivably connected to a power source at the other, a second shaft having a bevel gear on one end opposed to said first shaft and operatively connected at its other end to workpiece supporting means for rotating a workpiece held thereby, a pair of opposed bevel gears complemental to and meshing with the first two said bevel gears, a shaft on which said last mentioned pair of gears are journaled, a ring gear carrying said shaft, a rack meshing with said ring gear, spring means at one end of said rack for urging it in one direction, a roller at the other end of said rack, a cam bar engaging said roller, a pivotally mounted sine bar engaging said roller, and means for holding said sine bar in an adjusted angle of inclination.

6. In apparatus for grinding helical gears, a grinding wheel, means for rotating said grinding wheel, means for supporting a workpiece having helical gear teeth in proper relation to said grinding wheel, power means for rotating said workpiece in synchrony with said grinding wheel, feeding mechanism for moving said workpiece support in a straight line path, a sine bar associated with the means for rotating the grinding wheel, means for obtaining rectilinear movement of said sine bar, means including a rack and roller means associated with said sine bar for translating said rectilinear motion to a first rotary motion of like degree, and means including a gear arrangement for translating said first rotary motion to a second rotary motion of lesser degree transversely angled to said first rotary motion.

7. In apparatus for grinding helical gears, means to provide added increments of rotation to a workpiece rotatable at a uniform speed, the said means comprising a spring loaded rack movable in the direction of its length and having a roller on one end thereof, a pivotally mounted sine bar having a face thereof extending at an angle to said rack and engaging said roller, differential gearing including a ring gear operable on said movable rack, said differential gearing being operable to rotate said workpiece at said uniform speed in the absence of rotation of said ring gear, and means to move said rack, roller and differential gearing in a rectilineal path and relative to said sine bar whereby said roller may exert a cam action on said movable rack to move the same and actuate said ring gear.

FLORYAN LOHUTKO.

REFERENCES CITED

The following references are of record in the file of this patent:

UNITED STATES PATENTS

| Number | Name | Date |
|---|---|---|
| 1,478,433 | Harris | Dec. 25, 1923 |
| 1,842,538 | Burgess | Jan. 26, 1932 |
| 2,307,238 | Ross | Jan. 5, 1943 |
| 2,330,921 | Rickenmann | Oct. 5, 1943 |
| 2,360,235 | Jellis | Oct. 10, 1944 |
| 2,424,191 | Rickenmann | July 15, 1947 |
| 2,449,354 | Wickman | Sept. 14, 1948 |